US012057640B2

(12) United States Patent
Aviv et al.

(10) Patent No.: US 12,057,640 B2
(45) Date of Patent: Aug. 6, 2024

(54) PATCH ANTENNA ARRAY WITH IMPROVED RADIATION EFFICIENCY

(71) Applicant: QUALCOMM Incorporated, San Diego, CA (US)

(72) Inventors: Assaf Aviv, Carlsbad, CA (US); Taesik Yang, San Diego, CA (US); Mohammad Ali Tassoudji, San Diego, CA (US); Kevin Hsi-Huai Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 135 days.

(21) Appl. No.: 17/951,052

(22) Filed: Sep. 22, 2022

(65) Prior Publication Data

US 2024/0106135 A1 Mar. 28, 2024

(51) Int. Cl.

| | |
|---|---|
| ***H01Q 21/24*** | (2006.01) |
| ***H01Q 1/24*** | (2006.01) |
| ***H01Q 1/48*** | (2006.01) |
| ***H01Q 9/04*** | (2006.01) |

(52) U.S. Cl.

CPC ............. *H01Q 21/24* (2013.01); *H01Q 1/243* (2013.01); *H01Q 1/48* (2013.01); *H01Q 9/045* (2013.01)

(58) Field of Classification Search

CPC .......... H01Q 21/24; H01Q 1/243; H01Q 1/48; H01Q 9/045

See application file for complete search history.

(56) References Cited

U.S. PATENT DOCUMENTS

| | | | |
|---|---|---|---|
| 6,995,709 | B2 | 2/2006 | Spittler |
| 9,077,082 | B2 | 7/2015 | Tatarnikov et al. |
| 10,230,174 | B2 | 3/2019 | Wang |
| 2010/0127939 | A1 | 5/2010 | Yusa |
| 2013/0082893 | A1 | 4/2013 | Wang et al. |
| 2022/0158357 | A1 | 5/2022 | Lee et al. |
| 2022/0166149 | A1 | 5/2022 | So et al. |

FOREIGN PATENT DOCUMENTS

| | | |
|---|---|---|
| KR | 20210151603 A | 12/2021 |

OTHER PUBLICATIONS

Hall P.S: "Dual Polarisation Antenna Arrays with Sequentially Rotated Feeding", IEE Proceedings H. Microwaves, Antennas & Propagation, Institution of Electrical Engineers. Stevenage, GB, vol. 139, No. 5, Oct. 1, 1992, pp. 465-471, XP000355102, Abstract, Sec 3.1, p. 467-p. 468, Figures 7,8.

International Search Report and Written Opinion—PCT/US2023/031309—ISA/EPO—Dec. 15, 2023.

*Primary Examiner* — Graham P Smith

(74) *Attorney, Agent, or Firm* — Haynes and Boone, LLP/Qualcomm Incorporated

(57) ABSTRACT

An antenna assembly includes an array of patch antennas arranged above a rectangular ground plane. The patch antennas are arranged in a sequence beginning at a first end of the rectangular ground plane and continuing across a width of the rectangular ground plane to a second end. With regard to this sequence, a plurality of polarization feeds alternate between being adjacent a first corner to being adjacent a second corner of the patch antennas and/or a plurality of via walls alternate in orientation along portions of a first edge of the rectangular ground plane and along portions of a second edge of the rectangular ground plane.

32 Claims, 6 Drawing Sheets

PATCH ANTENNA ARRAY WITH IMPROVED RADIATION EFFICIENCY

FIELD OF TECHNOLOGY

The present disclosure relates generally to antennas, and more particularly to a patch antenna array with improved radiation efficiency.

BACKGROUND

For wireless systems employed in millimeter wavelength (mmW) spectrums (e.g., 24 GHz to 48 GHz for 5G NR high bands, also referred to as FR2, although higher frequencies may be used), it is desirable to include a multi-band antenna or antenna array in a single device to increase transmission and reception capabilities of the device. Millimeter wave antennas may be patch antennas. To provide coverage over multiple frequency bands, the patch antennas may be multi-layer patch antennas. But patch antenna radiation is based upon a fringing field such that conventional multi-layer patch antennas often suffer from lowered gain and radiation efficiency when placed into a mobile device.

SUMMARY

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In accordance with an aspect of the disclosure, an antenna assembly is provided that includes: a substrate; a first metal layer adjacent a surface of the substrate and configured to form a rectangular ground plane having a first edge that extends across a width of the rectangular ground plane; a second metal layer configured to form a first linear array of patch antennas spaced from the rectangular ground plane, the first linear array of patch antennas being configured to extend across a length substantially equal to the width of the rectangular ground plane, wherein the first metal layer is between the substrate and the second metal layer; a first feed coupled to a first portion of a first patch antenna in the first linear array of patch antennas, the first portion being spaced apart from a center of the first patch antenna towards the first edge; and a first plurality of vias coupled to the first metal layer and configured to form a first via wall that extends only along a portion of the first edge that is adjacent the first patch antenna.

In accordance with another aspect of the disclosure, an antenna assembly is provided that includes: a rectangular ground plane having a first edge and a second edge that both extend across a width of the rectangular ground plane; a plurality of patch antennas above the rectangular ground plane, the plurality of patch antennas being configured into a linear array that extends across a length substantially equal to the width of the rectangular ground plane, each patch antenna in the plurality of patch antennas including a first portion closer to the first edge and a second portion closer to the second edge; a plurality of first feeds arranged in a sequence corresponding to the plurality of patch antennas, the plurality of first feeds being configured to alternate in orientation such that each subsequent first feed in the sequence is configured to couple to the second portion of a respective patch antenna responsive to a preceding first feed in the sequence being configured to couple to the first portion of a respective patch antenna and such that each subsequent first feed in the sequence is configured to couple to the first portion of its respective patch antenna responsive to the preceding first feed in the sequence being configured to couple to the second portion of its respective patch antenna; and a plurality of via walls coupled to the rectangular ground plane and arranged corresponding to the plurality of patch antennas, the plurality of via walls being configured to alternate in orientation such that each via wall is configured to extend only along a portion of the first edge adjacent a respective patch antenna responsive to the respective patch antenna's first feed being coupled to the respective patch antenna's first portion and such that each via wall is configured to extend only along a portion of the second edge adjacent the respective patch antenna responsive to the respective patch antenna's first feed being coupled to the respective patch antenna's second portion.

In accordance with yet another aspect of the disclosure, an antenna assembly is provided that includes: a rectangular ground plane having a first edge and a second edge that both extend across a width of the rectangular ground plane from a first end to a second end, the rectangular ground plane including a first portion that extends from the first end to a second portion of the rectangular ground plane; a first rectangular patch antenna and a second rectangular patch antenna both being spaced apart from the rectangular ground plane by an antenna height, the first rectangular patch antenna being adjacent the first portion and the second rectangular patch antenna being adjacent the second portion, each rectangular patch antenna being symmetric with respect to an axis for the rectangular patch antenna extending from a first corner of the rectangular patch antenna to an opposing second corner of the rectangular patch antenna, wherein the axis is orthogonal to the first edge and to the second edge; a first feed coupled to a first portion of the first rectangular patch antenna that is spaced apart from a center of the first rectangular patch antenna towards the first rectangular patch antenna's first corner; and a first plurality of vias coupled to the rectangular ground plane, each via being configured to extend from the rectangular ground plane to substantially the antenna height, the first plurality of vias being configured to extend only along the first edge of the rectangular ground plane in the first portion.

In accordance with yet another aspect of the disclosure, an antenna assembly is provided that includes: a ground plane having a first edge and a second edge that both extend across a width of the ground plane; a first rectangular patch antenna and a second rectangular patch antenna both being spaced apart from the rectangular ground plane by an antenna height; a plurality of parasitic patches disposed adjacent each of the first rectangular patch antenna and the second rectangular patch antenna, each rectangular patch antenna and it's corresponding plurality of parasitic patches being symmetric, disregarding any feed interfaces, with respect to an axis for the rectangular patch antenna extending from a first corner of the rectangular patch antenna to an opposing second corner of the rectangular patch antenna, wherein the axis is orthogonal to the first edge and to the second edge; a first feed coupled to a first portion of the first rectangular patch antenna that is spaced apart from a center of the first rectangular patch antenna towards the first rectangular patch antenna's first corner; a second feed coupled to a first portion of the second rectangular patch antenna that is spaced apart from a center of the second rectangular patch antenna towards the second rectangular patch antenna's second corner; a first plurality of vias coupled to the ground plane, each via of the first plurality of vias being configured to extend from the ground plane to substantially the antenna height, the first plurality of vias being configured to extend in a first line along the first edge of the ground plane, wherein the first line intersects two of the plurality of parasitic patches disposed adjacent the first rectangular patch antenna; and a second plurality of vias coupled to the ground plane, each via of the second plurality of vias being configured to extend from the ground plane to substantially the antenna height, the second plurality of vias being configured to extend in a second line along the second edge of the ground plane, wherein the second line intersects two of the plurality of parasitic patches disposed adjacent the second rectangular patch antenna.

Other aspects, features, and implementations of the present disclosure will become apparent to those of ordinary skill in the art, upon reviewing the following description of specific, exemplary implementations of the present disclosure in conjunction with the accompanying figures. While features of the present disclosure may be discussed relative to certain implementations and figures below, all implementations of the present disclosure can include one or more of the advantageous features discussed herein. In other words, while one or more implementations may be discussed as having certain advantageous features, one or more of such features may also be used in accordance with the various implementations of the disclosure discussed herein. In similar fashion, while exemplary implementations may be discussed below as device, system, or method implementations it should be understood that such exemplary implementations can be implemented in various devices, systems, and methods.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various implementations and to explain various principles and advantages in accordance with the present disclosure.

DETAILED DESCRIPTION

It is advantageous to locate millimeter wave antennas along the edge of a cellular telephone housing to reduce the interaction with the user as the user holds the cellular telephone or to reduce the interaction with other components of the telephone. But modern cellular telephones are low-profile devices such that the height of the device housing is relatively small (e.g., 5 to 6 mm or even less). And the length of the housing may be relatively long such as well over 100 mm. The edge of a modern cellular telephone housing is thus defined by a relatively long or wide rectangle having a relatively short height. Note that while some telephones have rounded edges, a cross-section of at least a portion of such telephones may be a rectangle. In the following discussion, it will be assumed that the rectangle length (which may also be denoted as the rectangle width) is aligned in the Cartesian x direction whereas the height is aligned in the Cartesian y direction. Given this edge geometry, millimeter wave patch antennas disposed such that their boresights intersect the edge are generally forced to form a linear array that is aligned or extends linearly in the x direction along the width of the rectangular edge. A ground plane for the linear array must fit within this rectangle and may have the same rectangular geometry and underlies the patch antennas.

Each patch antenna may couple to a vertical polarization feed and a horizontal polarization feed. Depending upon which feed is active, the patch antenna transmits (or receives) in the corresponding linear polarization. In the following discussion, it will be assumed that a horizontally polarized electric field as excited by the horizontal polarization feed is aligned with the x direction whereas a vertically polarized electric field as excited by the vertical polarization feed is aligned in the y direction. Given this orientation, note that the horizontally polarized electric field is aligned with the relatively long width of the (rectangular) ground plane whereas the vertically polarized electric field is aligned with the relatively short height of the (rectangular) ground plane. More generally, a first linear polarization for the patch array has an electric field that is aligned with the relatively long width of the (rectangular) ground plane whereas a second linear polarization for the patch array that is orthogonal to the first linear polarization has an electric field that aligned with the relatively short height of the (rectangular) ground plane. Depending upon the frequency of the transmissions, the asymmetry between the ground plane dimensions that are aligned with the electric field for the two linear polarizations may result in a marked difference in radiation efficiency for one linear polarization as compared to the other.

Figure 1:
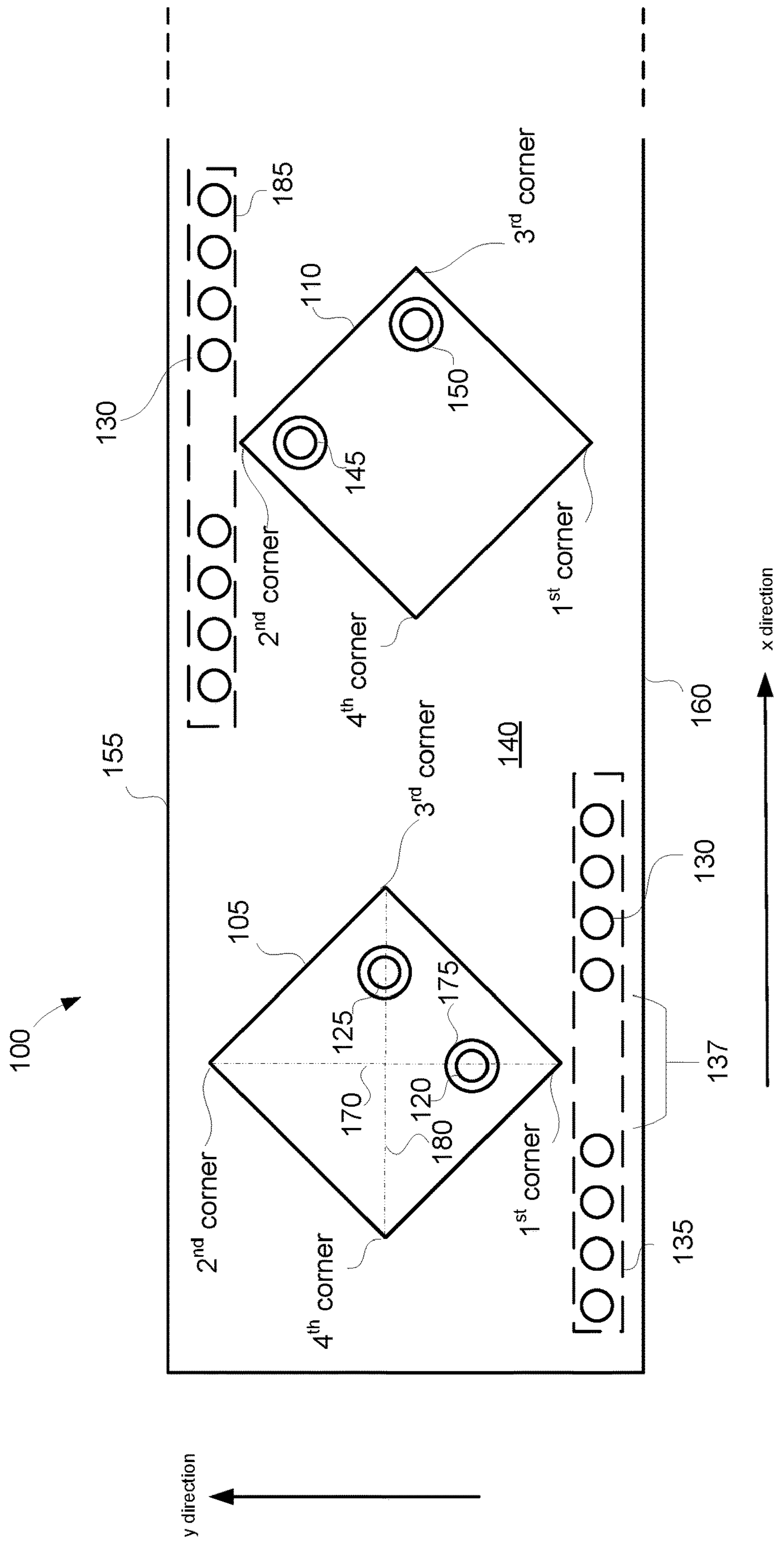
FIG. 1 is a plan view of a portion of a single-band antenna assembly with an array of patch antennas and including alternating via walls and feeds in accordance with an aspect of the disclosure.

The following discussion will assume without loss of generality that it is the vertical linear polarization that has the reduced radiation efficiency. This reduced radiation efficiency is tied to the height of the rectangular ground plane being markedly smaller than the width of the rectangular ground plane. To improve the radiation efficiency for transmissions using the vertical linear polarization, vias are provided. In some examples, a via wall is provided that alternates along edges of the rectangular ground plane. An example single-band antenna array (which may also be denoted as an antenna assembly) 100 is shown in FIG. 1 that includes a patch 105 and a patch 110 above a rectangular ground plane 140. Rectangular ground plane 140 has a width that extends in the Cartesian x direction whereas its height extends in the Cartesian y direction.

Patches 105 and 110 are both square rectangles but non-square rectangular or rounded patches may be used in alternative implementations. Array 100 may include additional patches (not illustrated) that would extend along the width of rectangular ground plane 140. With regard to its width, the rectangular ground plane 140 has an upper horizontal edge 155 and a lower horizontal edge 160. The edges of patches 105 and 110 are rotated or tilted by 45 degrees with respect to horizontal edges 155 and 160. For example, patch 105 has a first corner facing edge 160 and an opposing second corner directed at edge 155. Similarly, patch 110 has a first corner directed at edge 160 and a second corner directed at edge 155. Other rotations may be used, however. In some examples, a non-square rectangular patch is rotated by an amount between about 20 and 70 degrees.

Given the 45-degree rotation of patch 105 with respect to horizontal edges 155 and 160 in the example illustrated in FIG. 1, a vertical central axis 170 that extends from the first corner of patch 105 to its opposing second corner is aligned in the y direction. Patch 110 has the same orientation, but its vertical central axis is not shown for illustration clarity. To excite a vertically polarized electric field aligned in the y direction, a vertical polarization feed may be located adjacent either the first corner or the opposing second corner along each patch's vertical central axis. For example, a vertical polarization feed 120 couples to patch 105 along the vertical central axis 170 adjacent to the first corner of patch 105. In some examples, the distance between the first corner and the center of the feed 120 is approximately 25% or less (e.g., 20% or 15% or less) of the distance between the first corner and the second corner. Vertical polarization feed 120 extends from a waveguide or trace (not illustrated) below the ground plane through an aperture in the ground plane (not illustrated) to an aperture 175 in patch 105. Vertical polarization feed 120 thus capacitively couples to patch 105 but a direct coupling may be used in alternative implementations. Other types of feed structures may also be used.

A horizontal central axis 180 for patch 105 extends from its third corner to an opposing fourth corner. Due to the 45-degree rotation of patch 105 with respect to horizontal edges 155 and 160 of rectangular ground plane 140 in the example illustrated in FIG. 1, horizontal central axis 180 extends in the x direction. An analogous horizontal central axis for patch 110 is not shown for illustration clarity. The patches 105, 110 may be symmetric about a point where the horizontal and vertical central axes intersect if feed interfaces are disregarded. To excite a horizontally polarized electric field in the x direction, a horizontal polarization feed may be located adjacent either the third corner or the opposing fourth corner along the patch's horizontal central axis. For example, a horizontal polarization feed 125 couples to patch 105 along the horizontal central axis 180 adjacent to the third corner of patch 105. In some examples, the distance between the third corner and the center of the feed 120 is approximately 25% or less (e.g., 20% or 15% or less) of the distance between the third corner and the fourth corner. A center of patch 105 lies at an intersection of vertical central axis 170 and horizontal central axis 180. Vertical polarization feed 120 couples to a portion of patch 105 that is spaced apart from this center towards the first corner along the vertical central axis. Similarly, horizontal polarization feed 125 couples to a portion of patch 105 that is spaced apart from the center of patch 105 along horizontal central axis 180 towards the third corner of patch 105.

The height of rectangular ground plane 140 with respect to the vertically polarized electric field excited by vertical polarization feed 120 is relatively short as compared to the width of rectangular ground plane 140 with respect to the horizontally polarized electric field excited by horizontal polarization feed 125. As discussed earlier, a vertical polarization radiation efficiency for patch 105 may thus be significantly less than a horizontal polarization radiation efficiency for patch 105. But the height of rectangular ground plane 140 cannot be extended due to the limited form factor along the edges of a modern cellular telephone housing. To effectively extend the height of rectangular ground plane 140, vias may be implemented. In the example illustrated in FIG. 1, an alternating sequence of via walls includes a via wall 135 aligned along the first edge 160. Via wall 135 extends along only a portion of first edge 160 that is adjacent patch 105. For example, the via wall 135 may not extend past a point that is midway between the third corner of patch 105 and the fourth corner of patch 110. In other examples, the via wall 135 extends past the midway point, but does not extend past a theoretical line extending perpendicularly from the horizontal edge 160 to the fourth corner of the patch 110.

Figure 2:
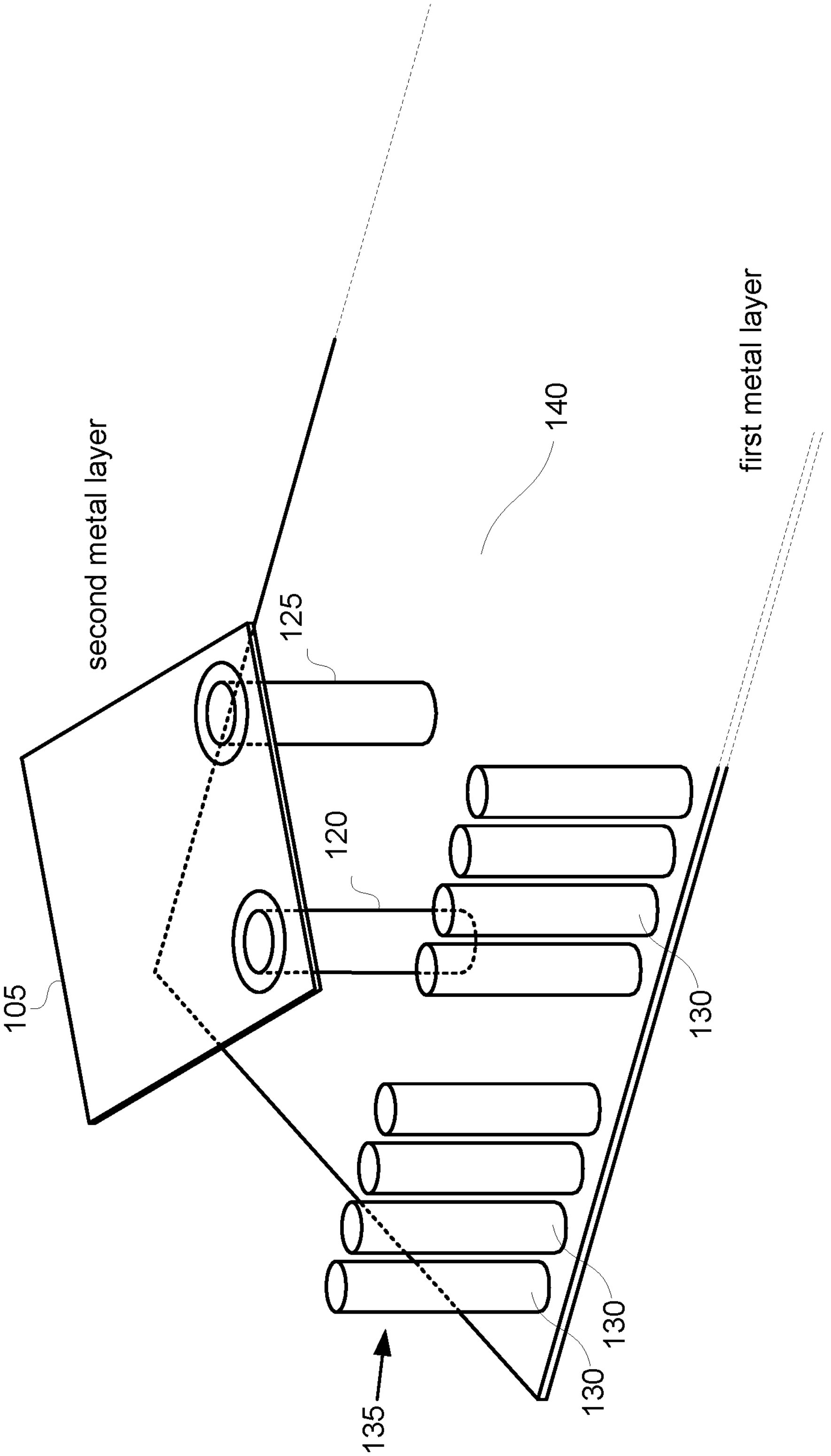
FIG. 2 is a perspective view of a portion of the single-band antenna assembly of FIG. 1.

Patch 105 is also shown in FIG. 2. The remaining patches in array 100 are not shown in FIG. 2 for illustration clarity. Rectangular ground plane 140 is formed in a first metal layer. Similarly, patch 105 is formed in a second metal layer spaced above rectangular ground plane 140 by an antenna height. Additional metal layers may be disposed between the illustrated first and second metal layers. Dielectric layers (not illustrated) alternate between the various metal layers. Vias 130 extend from the first metal layer to a height of the second metal layer. In some implementations, the vias 130 are connected to a ground plane that is local to the antenna 105 or local to several adjacent antennas in addition to or instead of being connected to the ground plane 140 running underneath all of the antennas in the array 100. The centers of each via 130 may be roughly aligned (e.g., the vias 130 may be disposed such that the centers thereof are substantially linear).

Referring again to FIG. 1, the dimensions of patches 105 and 110 depend upon the desired frequency of operation. Should a patch be designed for higher frequency operation, the patch dimensions such as axes 170 and 180 will shrink accordingly. Conversely, the patch dimensions increase should a patch be designed for lower frequency operation. As the patch dimensions increase, the first and second corners get closer and closer to horizontal edges 155 and 160, respectively. Vias 130 in via wall 135 may thus be absent in a central region 137 adjacent the first corner of patch 105 so as to avoid electrical contact between the via wall 135 and patch 105. Thus, while the first corner of the patch 105 is illustrated as being outside of the dotted line delineating the via wall 135, the first corner may instead extend into the area surrounded by the dotted line. Thus, a portion of the patch 105 may extend lower than a theoretical line orthogonal to the topmost points of the vias 130 in FIG. 1. In other examples, the vias 130 are formed in the central region 137. For example, spacing between all vias in the via wall 135 may be roughly consistent. A greater or fewer number of vias 130 than are illustrated in FIG. 1 may be included in the via wall 135. In some examples, there are four or more vias (separated into two groups, in some implementations) in the via wall 135. For example, there may be eight or more vias in the via wall 135.

Although via wall 135 improves the vertical polarization radiation efficiency of patch 105, note that coupling to adjacent patches such as patch 110 may decrease or even eliminate this radiation efficiency increase. To address this coupling, the vertical polarization feeds and via walls alternate from one patch to another in the illustrated example. For example, patch 110 has a vertical polarization feed 145 that is adjacent the second corner of patch 110 and thus is adjacent horizontal edge 155. In contrast, vertical feed 120 of patch 105 is adjacent the first corner of patch 105 and is thus adjacent horizontal edge 160. Similarly, a via wall 185 of vias 130 for patch 110 is aligned with horizontal edge 155 whereas via wall 135 for patch 105 is aligned with horizontal edge 160. Via wall 185 extends only along a portion of edge 155 that is adjacent patch 110. Given this alternation of the vertical polarization feeds, an RF signal source drives vertical polarization feed 120 with an RF signal that is 180 degrees out of phase with an RF signal driving vertical polarization feed 145. Since the rectangular ground plane 140 has a sufficient width across array 100, the horizontal polarization feeds do not need to be alternated as occurs for the vertical polarization feeds. For example, a horizontal polarization feed 150 for patch 110 is adjacent the third corner of patch 110 analogously as discussed for horizontal feed 125 for patch 105. In other examples, the horizontal polarization feeds may alternate. In such examples, however, the horizontal polarization feeds may be disposed in the corners nearest one another in two adjacent patches. For example, the feed 125 may be adjacent the third corner of patch 105 while the feed 150 may be adjacent the fourth corner of patch 110 (in an example which isn't illustrated). In contrast, disposing the horizontal polarization feeds in the same corner of all of the patches (as illustrated in FIG. 1) may reduce the likelihood of coupling between the antennas and/or may alleviate space constraints, for example due to filters or other components or routings for the horizontal polarization feeds being spaced apart.

The vias 130 in the via wall 185 may be configured similar to the vias 130 in the via wall 135, except that the vias 130 in the via wall 185 may be disposed near the horizontal edge 155 and the second corner of the patch 110. For example, the vias 130 in the via wall 185 may be arranged linearly, and may be present in a central region of the via wall 185 or absent therefrom. As another example, the second corner of the patch 110 may extend into the area surrounded by the dotted line delineating the via wall 185 or may remain outside thereof. Further, the vias 130 may be grounded, for example by being connected to a local ground plane and/or to the ground plane 140. A greater or fewer number of vias 130 than are illustrated in FIG. 1 may be included in the via wall 185. In some examples, there are four or more vias (separated into two groups, in some implementations) in the via wall 185. For example, there may be eight or more vias in the via wall 185.

The patches 105 and 110 are illustrated as being offset, for example such that the horizontal central axis 180 is not aligned with a horizontal central axis (not illustrated) of the patch 110. In other examples, the horizontal central axes may be aligned. For example, centers of all horizontal polarization feeds in the array 100 may be disposed linearly.

In some examples, via walls near adjacent patches may be disposed on the same side of the ground plane 140. For example, the via wall 135 and the via wall 185 may both be disposed near the horizontal edge 160, or may both be disposed near the horizontal edge 155. In some examples, all of the vias 130 for the array 100 are arranged along the same horizontal edge.

In some examples, via walls may be disposed along both sides of the ground plane 140 in the x direction for a particular antenna(s) or for all antennas in the array. For example, in addition to the via walls 135 and 185, a via wall may be disposed near the second corner of the patch 105, along the horizontal edge 155, and/or near the first corner of the patch 110, along the horizontal edge 160.

In some examples, there are no grounded vias disposed between the patches 105 and 110 (or between any two adjacent antennas). In some examples, there are no grounded vias which extend up to the metal layer in which the patches 105, 110 are disposed and which are also located between the patches 105, 110 (or between any two adjacent antennas). For example, grounded vias may be absent from an area between the patches 105 and 110 defined by a theoretical line connecting the second corner of the patch 105 to the second corner of the patch 110 and a theoretical line connecting the first corner of the patch 105 to the first corner of the patch 110.

In some examples, the patches 105 and 110 are not rotated with respect to the ground plane 140. For example, the edges of the patches 105 and 110 may be roughly parallel to the edges of rectangular ground plane 140. In some such examples, the feeds for these patches are disposed roughly in the center of two abutting edges instead of adjacent two corners. In this configuration, one polarization feed may be maintained in roughly the same position on each patch while the feed for another polarization may alternate sides between patches.

A next antenna in the array 100 may be configured similar to the patch 105, having feeds, a via wall, etc. disposed in the same relative locations. Further, a fourth antenna in the array 100 following this next antenna may be configured similar to the patch 110, having feeds, a via wall, etc. disposed in the same relative locations. In this way, the feed locations for one polarization and/or via wall locations may alternate between adjacent antennas in a sequence of patches/antennas, while the feed locations for another polarization remain consistent.

To provide a dual band capability, stacked patches may be used. For example, a low-band patch in a stacked pair may be relatively adjacent the ground plane whereas a high-band patch in the stacked pair may be above the low-band patch and thus spaced further apart from the ground plane. This stacking may be reversed such that it is the high-band patch that intervenes between the low-band patch and the ground plane. In some implementations the radiation efficiency in both horizontal and vertical polarization is sufficient for low-band operation such that the alternating vertical polarization feeds and/or via walls improve the high-band vertical polarization radiation efficiency. However, it will be appreciated that the low-band vertical polarization radiation efficiency may benefit as well from the alternating vertical polarization feeds and/or via walls.

Figure 3:
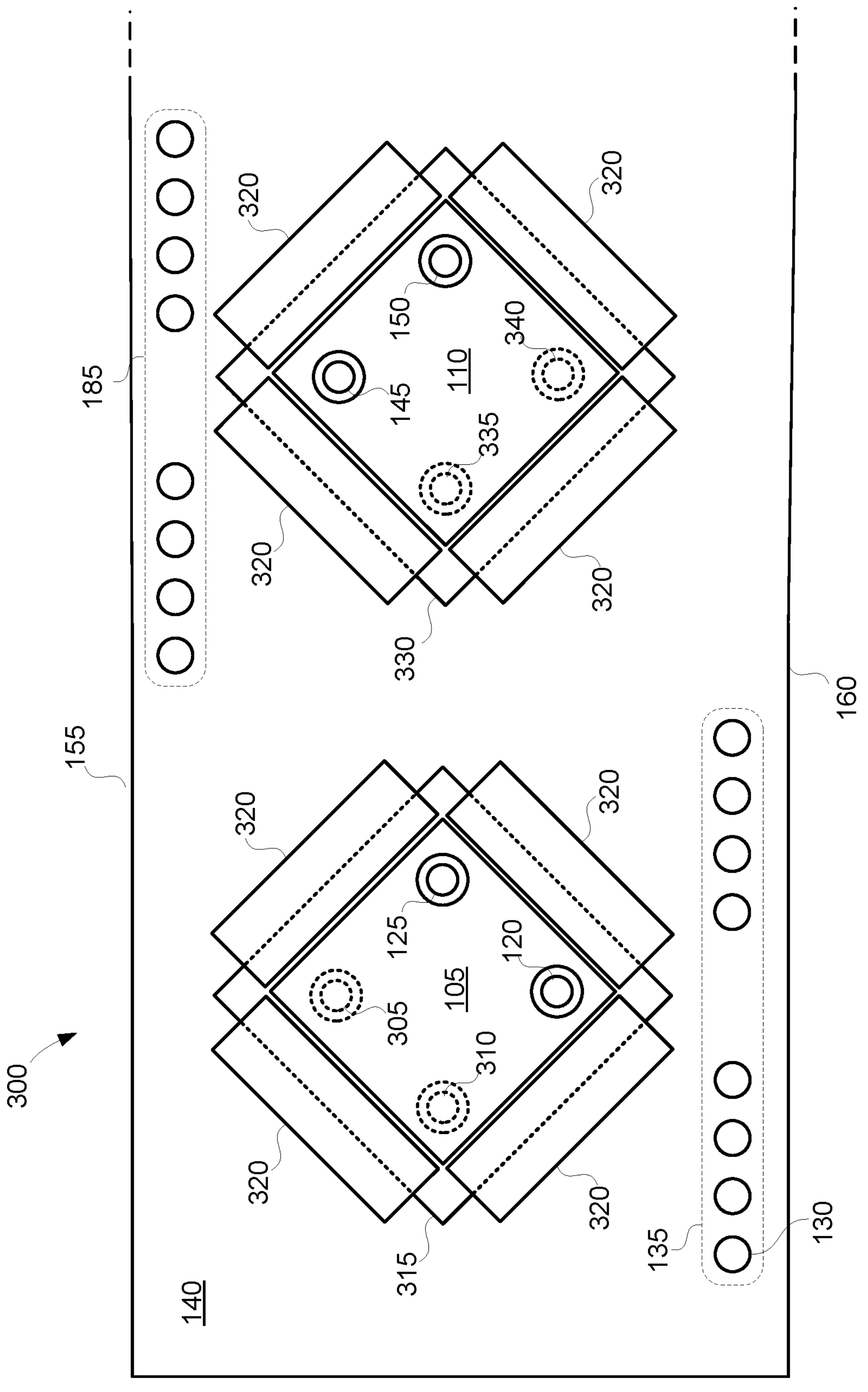
FIG. 3 is a plan view of a portion of a dual-band antenna assembly with two arrays of patch antennas and including alternating via walls and feeds in accordance with an aspect of the disclosure.

An example dual-band array 300 (which may also be denoted as a dual-band antenna assembly) is shown in FIG. 3. Patch 105 is as discussed for array 100 and couples to vertical polarization feed 120 and horizontal feed 125 accordingly. However, a low-band patch 315 lies between (rectangular) ground plane 140 and patch 105. Patch 105 is thus a high-band patch 105 in array 300. For example, patch 315 may be configured to operate with frequencies between about 24 GHz and 30 GHz, and patch 105 may be configured to operate with frequencies between about 37 GHz and 44 GHz (although other frequency configurations are possible). To assist the operation of high-band patch 105, the metal layer for high-band patch 105 is also configured to include parasitic patches 320 adjacent the patch 105. In other examples, the parasitic patches 320 are disposed in a metal layer different from the metal layer in which the patch 105 disposed. As shown in FIG. 3, the parasitic patches 320 may have the same length as the patch 105, but may have a significantly smaller width (e.g., 25%-35%. of the width of patch 105). When the parasitic patches 320 are disposed in a metal layer different from the metal layer in which the patch 105 disposed, the parasitic patches 320 may overhang the patch 105 slightly when viewed from above. In such configurations, the length and/or width of the parasitic patches may vary from the dimensions described above.

A vertical polarization feed 305 for low-band patch 315 is adjacent horizontal edge 155 since vertical polarization feed 120 for high-band patch 105 is adjacent horizontal edge 160. Similarly, a horizontal polarization feed 310 is located on the opposite side of low-band patch 315 as compared to horizontal polarization feed 125.

Patch 110 is a high-band patch 110 in dual-band array 300. High-band patch 110 thus couples to vertical polarization feed 145 and horizontal polarization feed 150 as discussed for array 100. Parasitic patches 320 assist the operation of high-band patch 110 as discussed for high-band patch 105. Via wall 185 aligns with horizontal edge 155 due to the alternation from via wall 135. A low-band patch 330 is formed in the same metal layer as used to form low-band patch 315. The patch 110 may be configured to operate with the same frequencies as the patch 105, and the patch 330 may be configured to operate with the same frequencies as the patch 315.

A vertical polarization feed 340 for low-band patch 330 is adjacent horizontal edge 160 since vertical polarization feed 145 for high-band patch 110 is adjacent horizontal edge 155. Similarly, a horizontal polarization feed 335 is located on the opposite side of low-band patch 330 as compared to horizontal polarization feed 150. Given this alternation of the vertical polarization feeds for the low-band patches 315, 330, an RF signal source drives vertical polarization feed 305 with an RF signal that is 180 degrees out of phase with an RF signal driving vertical polarization feed 340.

Figure 4:
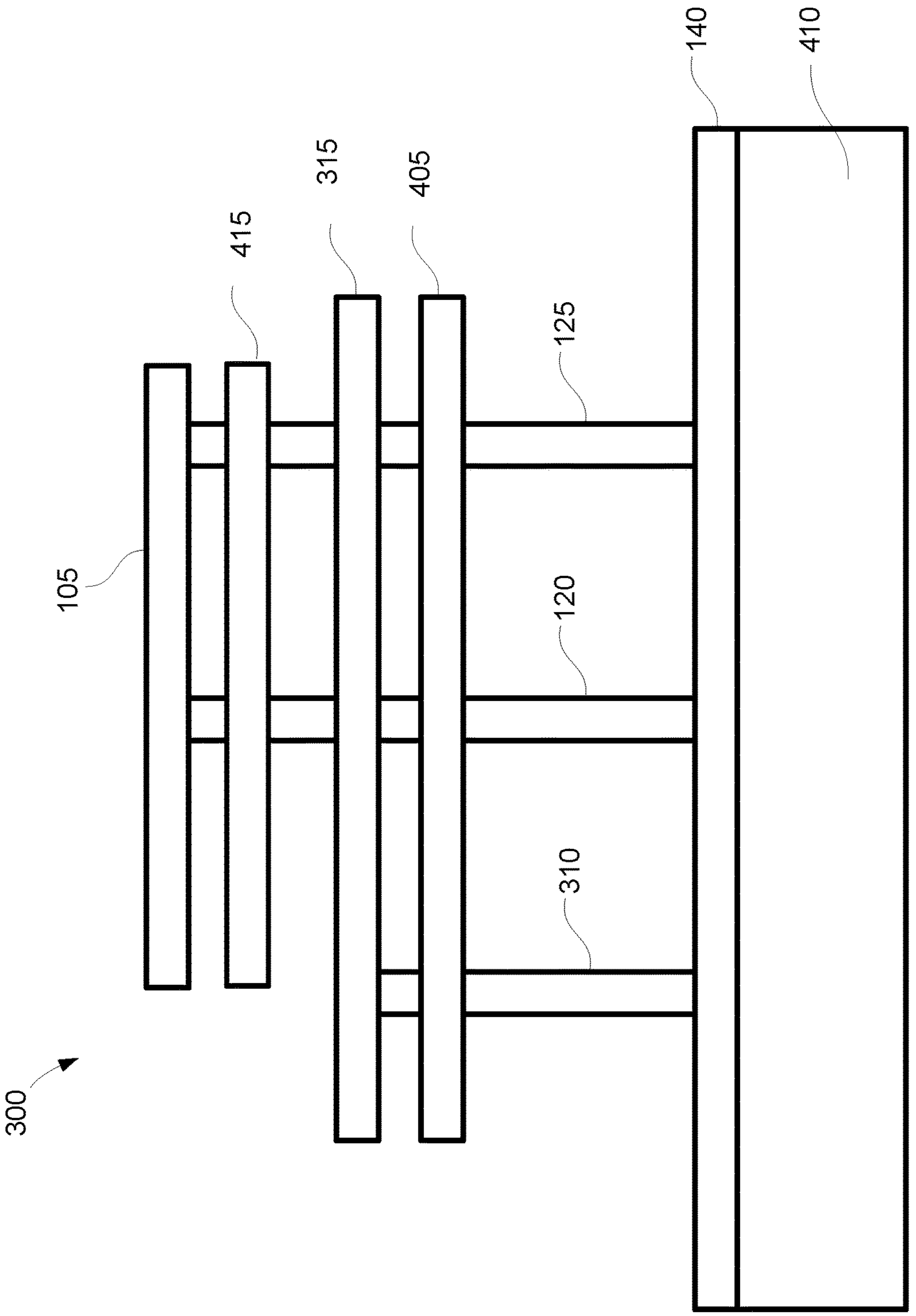
FIG. 4 is a cross-sectional view of a portion of the dual-band antenna assembly of FIG. 3.

A portion of dual-band array 300 is shown in cross-section (e.g., looking from horizontal edge 160 toward the patches) in FIG. 4. Ground plane 140 is adjacent a substrate 410, which may be a semiconductor die or a circuit board substrate. To enhance performance, a parasitic low-band patch 405 (not illustrated in FIG. 3) may be formed in a metal layer adjacent to the metal layer forming low-band patch 315. The parasitic low-band patch 405 may be sized and shaped similar to the low-band patch 315, or may be slightly larger. Similarly, a parasitic high-band patch 415 (not illustrated in FIG. 3) may be formed in a metal layer adjacent to the metal layer forming high-band patch 105. The parasitic high-band patch 415 may be sized and shaped similar to the high-band patch 105, or may be slightly larger. Vertical polarization feed 120 and horizontal polarization feed 125 pass through apertures (not illustrated) in parasitic low-band patch 405, low-band patch 315, and parasitic high-band patch 415 to couple to high-band patch 105. Similarly, horizontal polarization feed 310 and vertical polarization feed 305 (FIG. 3) pass through apertures (not illustrated) in parasitic low-band patch 405 to couple to low-band patch 315. Parasitic patches 320 for high-band patch 105 are not shown in FIG. 4 for illustration clarity but may be formed in the same metal layer forming high-band patch 105, or may be formed in a different layer. Similarly, the vias 130 are not shown in FIG. 4 for illustration clarity, but may extend from the ground plane 140 (or another ground plane local to the patches 105, 415, 315, 405) up to a metal layer in which any of the patches 105, 415, 315, 405 are disposed. For example, one or more vias 130 may extend from the ground plane to a metal layer in which the patch 315 is disposed. In another example, one or more vias 130 extend from the ground plane to a metal layer in which the patch 105 is disposed. In some examples, one or more vias extend from the ground plane to an uppermost metal layer. All vias 130 may extend up to the same metal layer, or the height of certain of the vias 130 may vary. Photolithographic techniques may be used to form the various antenna structures such as low-band patch 315, parasitic low-band patch 405, high-band patch 105, parasitic patches 320, and vias 130. The patches 105, 315, and parasitic patches 320, 405, 415 may be symmetric about a point where horizontal and vertical central axes (not illustrated in FIG. 3 or 4) intersect if feed interfaces are disregarded.

Figure 5:
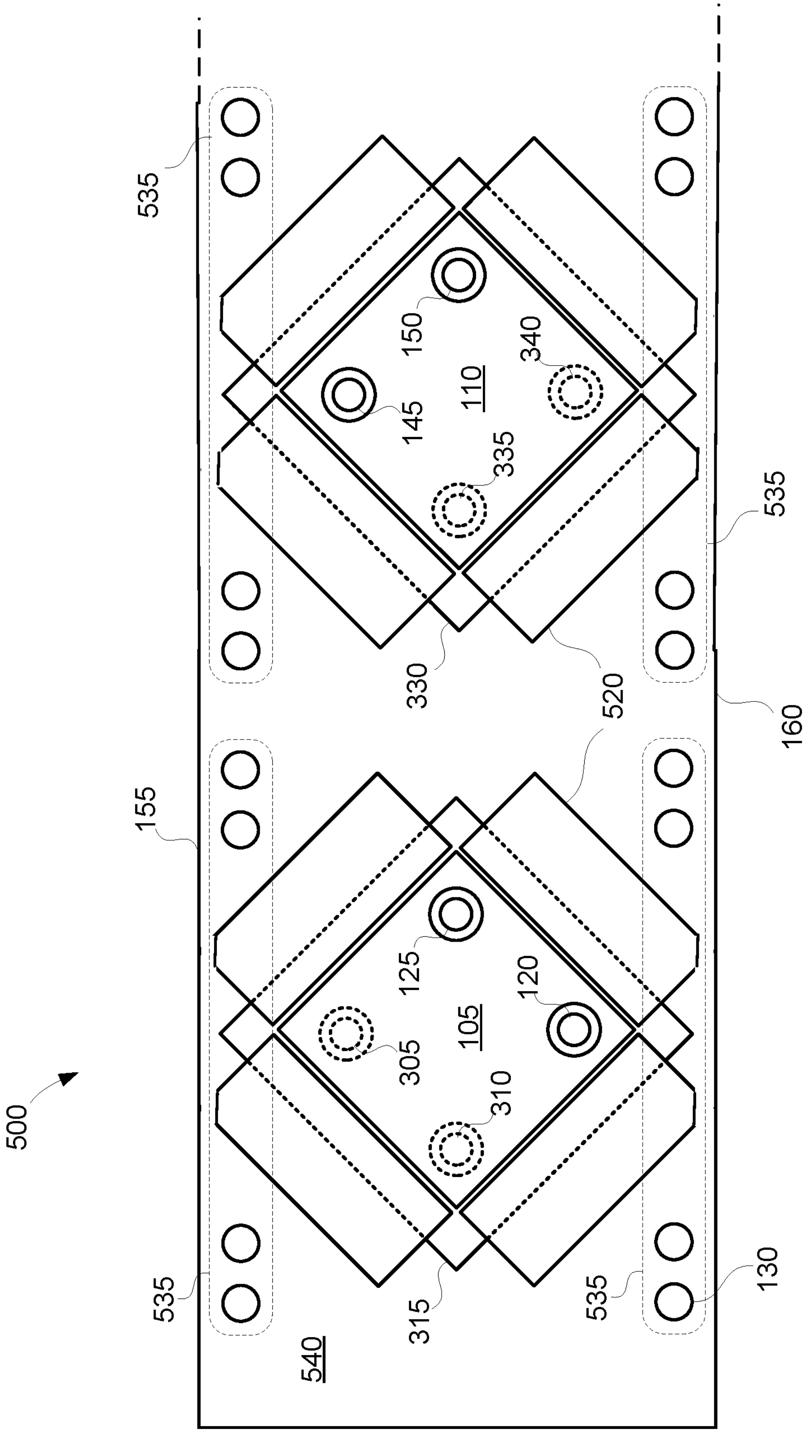
FIG. 5 is a plan view of a portion of a dual-band antenna assembly with two arrays of patch antennas and including vias and alternating feeds in accordance with an aspect of the disclosure.

Another example dual-band array 500 (which may also be denoted as a dual-band antenna assembly) is shown in FIG. 5. The array 500 is similar to the array 300 (FIG. 3), but the height of the (rectangular) ground plane 540 is smaller than the height of the ground plane 140. This may allow for a size reduction of the array 500 as compared to the array 300. Further, the width of the parasitic patches 520 is larger than the width of the parasitic patches 320. The width of the parasitic patches 520, however, is still substantially smaller than a width of the patches 105 and 110 (e.g., approximately 40%-45% of the width of the patches 105, 110). In addition, one corner of each parasitic patch 520 is truncated to fit within the reduced dimensions of the ground plane 540. The patches 105, 315 and parasitic patches 520 (and parasitic patches 405, 415, when included, see FIG. 4) may be symmetric about a vertical central axis (not illustrated in FIG. 5) if feed interfaces are disregarded.

Another difference between the array 300 and the array 500 is that the parasitic patches 520, and optionally the patches 315 and 330, extend into the area surrounded by the dotted line which delineates via walls 535. The vias 130 of each via wall 535 may be linearly arranged, and a portion of the patches 520 (and optionally a portion of the patches 315, 330) may intersect a theoretical line connecting all of the vias in a via wall 535. Further, in the illustrated example, there are fewer vias 130 in each via wall 535 than are illustrated in the via walls 135, 185 (FIG. 3). In the example illustrated in FIG. 5, each via wall 535 includes four vias which are split into two groups of two. The reduced number of vias may allow for a via-less central region of increased size in the via wall 535 such that no vias 130 interfere with the parasitic patches 520. Further, a via wall 535 is disposed along both horizontal edges 155, 160 for each antenna. The vertical polarization feeds, however, alternate between antennas, similar to how they alternate in array 300.

Figure 6:
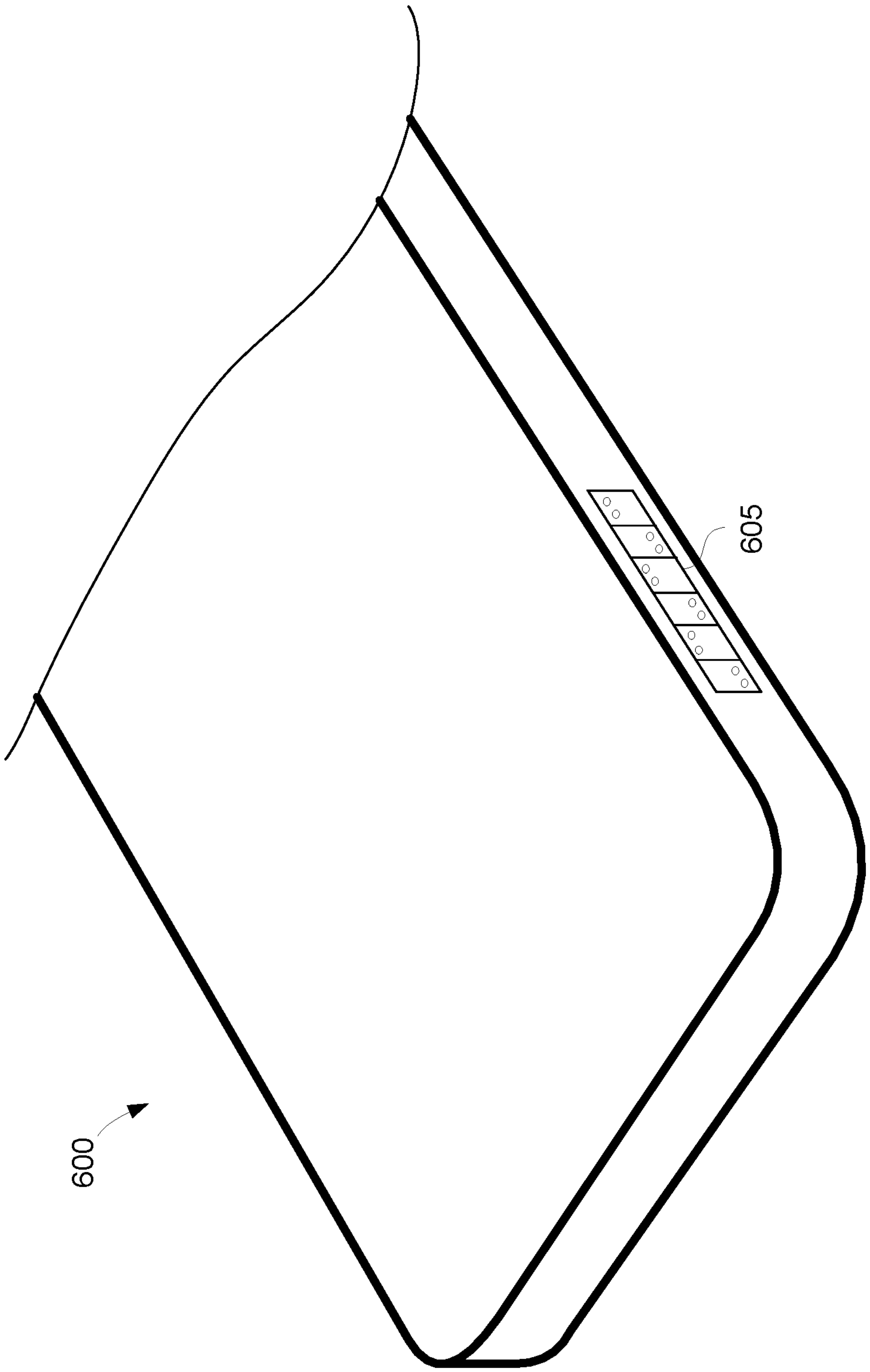
FIG. 6 illustrates a cellular telephone with an antenna assembly arranged along an edge of the cellular telephone and including alternating via walls and feeds in accordance with an aspect of the disclosure.

A portion of a cellular telephone 600 is shown in FIG. 6 that includes an example array 605 having a plurality of alternating via walls located along an edge of cellular telephone 600. For illustration clarity, the corresponding patches are not shown but may be arranged as discussed for dual-band array 300 or single-band array 100. As described above, via walls may instead be disposed along both horizontal edges of the array 605, for example as illustrated with respect to dual-band array 500. Further, feeds for one polarization may alternate in the same way in which the via walls are illustrated as alternating in FIG. 6. Feeds for another polarization may not alternate in some examples.

A cellular telephone is recited in the text above for ease of description, but it will be appreciated that an array of antennas as described herein may be implemented in any device configured to communicate wirelessly. For example, such array may be implemented in a laptop computer, a tablet, an extended reality device, an internet of things (IoT) device, a medical device, etc.

The disclosure will now be summarized in the following example clauses.

Clause 1. An antenna assembly, comprising:

a substrate;

a first metal layer adjacent a surface of the substrate and configured to form a rectangular ground plane having a first edge that extends across a width of the rectangular ground plane;

a second metal layer configured to form a first linear array of patch antennas spaced from the rectangular ground plane, the first linear array of patch antennas being configured to extend across a length substantially equal to the width of the rectangular ground plane, wherein the first metal layer is between the substrate and the second metal layer;

a first feed coupled to a first portion of a first patch antenna in the first linear array of patch antennas, the first portion being spaced apart from a center of the first patch antenna towards the first edge; and a first plurality of vias coupled to the first metal layer and configured to form a first via wall that extends only along a portion of the first edge that is adjacent the first patch antenna.

Clause 2. The antenna assembly of clause 1, wherein the rectangular ground plane includes a second edge that extends across the width of the rectangular ground plane, the antenna assembly further comprising:

a second feed coupled to a first portion of a second patch antenna in the first linear array of patch antennas, the first portion of the second patch antenna being spaced apart from a center of the second patch antenna towards the second edge; and a second plurality of vias coupled to the first metal layer and configured to form a second via wall that extends only along a portion of second edge that is adjacent the second patch antenna.

Clause 3. The antenna assembly of clause 2, wherein the first feed is configured to cause the first patch antenna to transmit and receive according to a first linear polarization, and wherein the second feed is configured to cause the second patch antenna to transmit and receive according to the first linear polarization.

Clause 4. The antenna assembly of clause 3, further comprising:

a third feed coupled to a second portion of the first patch antenna, the second portion of the first patch antenna being spaced apart from the center of the first patch antenna in a direction that is parallel to the first edge and to the second edge; and a fourth feed coupled to a second portion of the second patch antenna, the second portion of the second patch antenna being spaced apart from the center of the second patch antenna in the direction that is parallel to the first edge and to the second edge.

Clause 5. The antenna assembly of clause 4, wherein the third feed is configured to cause the first patch antenna to transmit and receive according to a second linear polarization that is orthogonal to the first linear polarization, and wherein the fourth feed is configured to cause the second patch antenna to transmit and receive according to the second linear polarization.

Clause 6. The antenna assembly of any of clauses 3-5, wherein the first linear polarization is defined by an electric field that is orthogonal to the first edge and to the second edge.

Clause 7. The antenna assembly of any of clauses 2-6, further comprising:

a third metal layer between the second metal layer and the first metal layer, the third metal layer being configured to form a second linear array of patch antennas adjacent to the first linear array of patch antennas.

Clause 8. The antenna assembly of clause 7, wherein the first linear array of patch antennas is configured for a first frequency and wherein the second linear array of patch antennas is configured for a second frequency that is lower than the first frequency.

Clause 9. The antenna assembly of any of clauses 7-8, wherein the first linear array of patch antennas is a first linear array of rectangular patch antennas, and wherein the second linear array of patch antennas is a second linear array of rectangular patch antennas.

Clause 10. The antenna assembly of clause 9, wherein the first linear array of rectangular patch antennas is a first linear array of square patch antennas and wherein the second linear array of rectangular patch antennas is a second linear array of square patch antennas.

Clause 11. The antenna assembly of clause 7, wherein the first patch antenna is a first square patch antenna, and wherein the second linear array of patch antennas includes a second square patch antenna adjacent the first square patch antenna, the second square patch antenna being larger than the first square patch antenna.

Clause 12. The antenna assembly of any of clauses 2-11, wherein the antenna assembly is integrated into an edge of a cellular telephone, wherein the width of the rectangular ground plane extends along a width of the edge of the cellular telephone, and wherein the width of the rectangular ground plane defines a longer edge of the rectangular ground plane.

Clause 13. An antenna assembly, comprising:

a rectangular ground plane having a first edge and a second edge that both extend across a width of the rectangular ground plane;

a plurality of patch antennas above the rectangular ground plane, the plurality of patch antennas being configured into a linear array that extends across a length substantially equal to the width of the rectangular ground plane, each patch antenna in the plurality of patch antennas including a first portion closer to the first edge and a second portion closer to the second edge;

a plurality of first feeds arranged in a sequence corresponding to the plurality of patch antennas, the plurality of first feeds being configured to alternate in orientation such that each subsequent first feed in the sequence is configured to couple to the second portion of a respective patch antenna responsive to a preceding first feed in the sequence being configured to couple to the first portion of a respective patch antenna and such that each subsequent first feed in the sequence is configured to couple to the first portion of its respective patch antenna responsive to the preceding first feed in the sequence being configured to couple to the second portion of its respective patch antenna; and a plurality of via walls coupled to the rectangular ground plane and arranged corresponding to the plurality of patch antennas, the plurality of via walls being configured to alternate in orientation such that each via wall is configured to extend only along a portion of the first edge adjacent a respective patch antenna responsive to the respective patch antenna's first feed being coupled to the respective patch antenna's first portion and such that each via wall is configured to extend only along a portion of the second edge adjacent the respective patch antenna responsive to the respective patch antenna's first feed being coupled to the respective patch antenna's second portion.

Clause 14. The antenna assembly of clause 13, wherein the rectangular ground plane is defined by the width and a height, wherein the width of the rectangular ground plane is greater than a height of the rectangular ground plane.

Clause 15. The antenna assembly of any of clauses 13-14, wherein each first feed in the plurality of first feeds is configured to cause the respective patch antenna to transmit and receive according to a first linear polarization.

Clause 16. The antenna assembly of clause 15, wherein the first linear polarization has an electric field that is orthogonal to the first edge and with the second edge.

Clause 17. The antenna assembly of clause 15, further comprising:

a plurality of second feeds corresponding to the plurality of patch antennas, each second feed in the plurality of second feeds being coupled to a respective patch antenna from the plurality of patch antennas and being configured to cause the respective patch antenna to transmit and receive according to a second linear polarization that is orthogonal to the first linear polarization.

Clause 18. The antenna assembly of clause 17, wherein the first linear polarization is a vertical linear polarization, and wherein the second linear polarization is a horizontal linear polarization.

Clause 19. The antenna assembly of any of clauses 13-18, further comprising:

a radio frequency (RF) transmitter configured to drive each subsequent first feed with an RF signal that is 180 degrees out of phase with an RF signal driven to the preceding first feed.

Clause 20. The antenna assembly of any of clauses 13-19, further comprising: a substrate adjacent the rectangular ground plane.

Clause 21. The antenna assembly of clause 20, wherein the substrate is a semiconductor die substrate.

Clause 22. An antenna assembly, comprising:

a rectangular ground plane having a first edge and a second edge that both extend across a width of the rectangular ground plane from a first end to a second end, the rectangular ground plane including a first portion that extends from the first end to a second portion of the rectangular ground plane;

a first rectangular patch antenna and a second rectangular patch antenna both being spaced apart from the rectangular ground plane by an antenna height, the first rectangular patch antenna being adjacent the first portion and the second rectangular patch antenna being adjacent the second portion, each rectangular patch antenna being symmetric with respect to an axis for the rectangular patch antenna extending from a first corner of the rectangular patch antenna to an opposing second corner of the rectangular patch antenna, wherein the axis is orthogonal to the first edge and to the second edge;

a first feed coupled to a first portion of the first rectangular patch antenna that is spaced apart from a center of the first rectangular patch antenna towards the first rectangular patch antenna's first corner; and a first plurality of vias coupled to the rectangular ground plane, each via being configured to extend from the rectangular ground plane to substantially the antenna height, the first plurality of vias being configured to extend only along the first edge of the rectangular ground plane in the first portion.

Clause 23. The antenna assembly of clause 22, further comprising:

a second plurality of vias coupled to the rectangular ground plane, each via in the second plurality of vias being configured to extend from the rectangular ground plane to substantially the antenna height, the second plurality of vias being configured to extend only along the second edge of the rectangular ground plane in the second portion.

Clause 24. The antenna assembly of clause 23, further comprising:

a second feed coupled to a first portion of the second rectangular patch antenna that is spaced apart from a center of the second rectangular patch antenna towards the second rectangular patch antenna's second corner.

Clause 25. The antenna assembly of any of clauses 23-24, wherein the first rectangular patch antenna and the second rectangular patch antenna each comprise a square patch antenna.

Clause 26. The antenna assembly of any of clauses 23-25, further comprising:

a third feed coupled to a second portion of the first rectangular patch antenna that is spaced apart from the center of the first rectangular patch antenna towards a third corner of the first rectangular patch antenna; and a fourth feed coupled to a second portion of second rectangular patch antenna that is spaced apart from the center of the second rectangular patch antenna towards a third corner of the second rectangular patch antenna.

Clause 27. The antenna assembly of clause 26, wherein the first feed and the second feed are both configured to excite a first linear polarization, and wherein the third feed and the fourth feed are both configured to excite a second linear polarization that is orthogonal to the first linear polarization.

Clause 28. The antenna assembly of clause 27, wherein the first linear polarization is a vertical linear polarization, and wherein the second linear polarization is a horizontal linear polarization.

Clause 29. The antenna assembly of clause 26, further comprising:

a third rectangular patch antenna arranged between the first rectangular patch antenna and the first portion of the rectangular ground plane; and a fourth rectangular patch antenna arranged between the second rectangular patch antenna and the second portion of the rectangular ground plane.

Clause 30. The antenna assembly of clause 29, wherein the third rectangular patch antenna and the fourth rectangular patch antenna are both configured for a first frequency and wherein the first rectangular patch antenna and the second rectangular patch antenna are both configured for a second frequency that is higher than the first frequency.

Clause 31. The antenna assembly of clause 2, wherein vias are absent from a portion of the second edge that is adjacent the first patch antenna and vias are absent from a portion of the first edge that is adjacent the second patch antenna, and wherein vias are absent from an area between the first patch and the second patch antennas.

Clause 32. The antenna assembly of clause 7, wherein the first patch antenna is a first square patch antenna and wherein the second patch antenna is a second square patch antenna, and wherein the second linear array of patch antennas includes a third square patch antenna adjacent the first square patch antenna and a fourth square patch antenna adjacent the second square patch antenna, the third square patch antenna being larger than the first square patch antenna and the fourth square patch antenna being larger than the second square patch antenna.

Clause 33. The antenna assembly of clause 32, further comprising a third feed coupled to a third portion of the third square patch antenna, the third portion being spaced apart from a center of the third square patch antenna towards the second edge, and further comprising a fourth feed coupled to a fourth portion of the fourth square patch antenna, the fourth portion being spaced apart from a center of the fourth square patch antenna towards the first edge.

Clause 34. An antenna assembly, comprising:

a ground plane having a first edge and a second edge that both extend across a width of the ground plane;

a first rectangular patch antenna and a second rectangular patch antenna both being spaced apart from the ground plane by an antenna height;

a plurality of parasitic patches disposed adjacent each of the first rectangular patch antenna and the second rectangular patch antenna, each rectangular patch antenna and it's corresponding plurality of parasitic patches being symmetric, disregarding any feed interfaces, with respect to an axis for the rectangular patch antenna extending from a first corner of the rectangular patch antenna to an opposing second corner of the rectangular patch antenna, wherein the axis is orthogonal to the first edge and to the second edge;

a first feed coupled to a first portion of the first rectangular patch antenna that is spaced apart from a center of the first rectangular patch antenna towards the first rectangular patch antenna's first corner;

a second feed coupled to a first portion of the second rectangular patch antenna that is spaced apart from a center of the second rectangular patch antenna towards the second rectangular patch antenna's second corner;

a first plurality of vias coupled to the ground plane, each via of the first plurality of vias being configured to extend from the ground plane to substantially the antenna height, the first plurality of vias being configured to extend in a first line along the first edge of the ground plane, wherein the first line intersects two of the plurality of parasitic patches disposed adjacent the first rectangular patch antenna; and a second plurality of vias coupled to the ground plane, each via of the second plurality of vias being configured to extend from the ground plane to substantially the antenna height, the second plurality of vias being configured to extend in a second line along the second edge of the ground plane, wherein the second line intersects two of the plurality of parasitic patches disposed adjacent the second rectangular patch antenna.

Clause 35. The antenna assembly of clause 34, wherein vias are absent from a portion of the second edge that is adjacent the first rectangular patch antenna and vias are absent from a portion of the first edge that is adjacent the second rectangular patch antenna, and wherein vias are absent from an area between the first rectangular patch antenna and the second rectangular patch antenna.

Clause 36. The antenna assembly of clause 34, wherein vias in the first plurality of vias are disposed adjacent the second rectangular patch antenna and vias in the second plurality of vias are disposed adjacent the first rectangular patch antenna, and wherein vias are absent from an area between the first rectangular patch antenna and the second rectangular patch antenna.

Clause 37. The antenna assembly of any of clauses 34-36, wherein the first rectangular patch antenna and the second rectangular patch antenna each comprise a square patch antenna.

Clause 38. The antenna assembly of any of clauses 34-37, further comprising:

a third feed coupled to a second portion of the first rectangular patch antenna that is spaced apart from the center of the first rectangular patch antenna towards a third corner of the first rectangular patch antenna; and a fourth feed coupled to a second portion of second rectangular patch antenna that is spaced apart from the center of the second rectangular patch antenna towards a third corner of the second rectangular patch antenna.

Clause 39. The antenna assembly of clause 38, wherein the first feed and the second feed are both configured to excite a first linear polarization, and wherein the third feed and the fourth feed are both configured to excite a second linear polarization that is orthogonal to the first linear polarization.

Clause 40. The antenna assembly of clause 39, wherein the first linear polarization is a vertical linear polarization, and wherein the second linear polarization is a horizontal linear polarization.

Clause 41. The antenna assembly of any of clauses 34-40, further comprising:

a third rectangular patch antenna arranged between the first rectangular patch antenna and the first portion of the rectangular ground plane; and a fourth rectangular patch antenna arranged between the second rectangular patch antenna and the second portion of the rectangular ground plane.

Clause 42. The antenna assembly of clause 41, wherein the third rectangular patch antenna and the fourth rectangular patch antenna are both configured for a first frequency and wherein the first rectangular patch antenna and the second rectangular patch antenna are both configured for a second frequency that is higher than the first frequency.

Clause 43. The antenna assembly of any of clauses 34-42, wherein each of the plurality of parasitic patches has one corner which is truncated to fit within the dimensions of the ground plane.

Clause 44. The antenna assembly of any of clauses 2-12, wherein the first patch antennas is rectangular and has an axis extending from a first corner of the patch antenna to an opposing second corner of the patch antenna, wherein the axis is orthogonal to the first edge and to the second edge.

The description set forth herein, in connection with the appended drawings, describes example configurations and does not represent all the examples that may be implemented or that are within the scope of the claims. The detailed description includes specific details for the purpose of providing an understanding of the described techniques. These techniques, however, may be practiced without these specific details. In some instances, well-known structures and devices are shown in block diagram form in order to avoid obscuring the concepts of the described examples. The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An antenna assembly, comprising:

a substrate;

a first metal layer adjacent a surface of the substrate and configured to form a rectangular ground plane having a first edge that extends across a width of the rectangular ground plane and a second edge that extends across the width of the rectangular ground plane;

a second metal layer configured to form a first linear array of patch antennas spaced from the rectangular ground plane, the first linear array of patch antennas being configured to extend across a length substantially equal to the width of the rectangular ground plane, wherein the first metal layer is between the substrate and the second metal layer;

a first feed coupled to a first portion of a first patch antenna in the first linear array of patch antennas, the first portion being spaced apart from a center of the first patch antenna towards the first edge;

a first plurality of vias coupled to the first metal layer and configured to form a first via wall that extends only along a portion of the first edge that is adjacent the first patch antenna;

a second feed coupled to a first portion of a second patch antenna in the first linear array of patch antennas, the first portion of the second patch antenna being spaced apart from a center of the second patch antenna towards the second edge; and a second plurality of vias coupled to the first metal layer and configured to form a second via wall that extends only along a portion of second edge that is adjacent the second patch antenna.

2. The antenna assembly of claim 1, wherein vias are absent from a portion of the second edge that is adjacent the first patch antenna and vias are absent from a portion of the first edge that is adjacent the second patch antenna, and wherein vias are absent from an area between the first patch and the second patch antennas.

3. The antenna assembly of claim 1, wherein the first feed is configured to cause the first patch antenna to transmit and receive according to a first linear polarization, and wherein the second feed is configured to cause the second patch antenna to transmit and receive according to the first linear polarization.

4. The antenna assembly of claim 3, further comprising:

a third feed coupled to a second portion of the first patch antenna, the second portion of the first patch antenna being spaced apart from the center of the first patch antenna in a direction that is parallel to the first edge and to the second edge; and a fourth feed coupled to a second portion of the second patch antenna, the second portion of the second patch antenna being spaced apart from the center of the second patch antenna in the direction that is parallel to the first edge and to the second edge.

5. The antenna assembly of claim 4, wherein the third feed is configured to cause the first patch antenna to transmit and receive according to a second linear polarization that is orthogonal to the first linear polarization, and wherein the fourth feed is configured to cause the second patch antenna to transmit and receive according to the second linear polarization.

6. The antenna assembly of claim 5, wherein the first linear polarization is defined by an electric field that is orthogonal to the first edge and to the second edge.

7. The antenna assembly of claim 1, further comprising:

a third metal layer between the second metal layer and the first metal layer, the third metal layer being configured to form a second linear array of patch antennas adjacent to the first linear array of patch antennas.

8. The antenna assembly of claim 7, wherein the first linear array of patch antennas is configured for a first frequency and wherein the second linear array of patch antennas is configured for a second frequency that is lower than the first frequency.

9. The antenna assembly of claim 7, wherein the first linear array of patch antennas is a first linear array of rectangular patch antennas, and wherein the second linear array of patch antennas is a second linear array of rectangular patch antennas.

10. The antenna assembly of claim 7, wherein the first patch antenna is a first square patch antenna and wherein the second patch antenna is a second square patch antenna, and wherein the second linear array of patch antennas includes a third square patch antenna adjacent the first square patch antenna and a fourth square patch antenna adjacent the second square patch antenna, the third square patch antenna being larger than the first square patch antenna and the fourth square patch antenna being larger than the second square patch antenna.

11. The antenna assembly of claim 10, further comprising a third feed coupled to a third portion of the third square patch antenna, the third portion being spaced apart from a center of the third square patch antenna towards the second edge, and further comprising a fourth feed coupled to a fourth portion of the fourth square patch antenna, the fourth portion being spaced apart from a center of the fourth square patch antenna towards the first edge.

12. The antenna assembly of claim 1, wherein the antenna assembly is integrated into an edge of a cellular telephone, wherein the width of the rectangular ground plane extends along a width of the edge of the cellular telephone, and wherein the width of the rectangular ground plane defines a longer edge of the rectangular ground plane.

13. An antenna assembly, comprising:

a rectangular ground plane having a first edge and a second edge that both extend across a width of the rectangular ground plane;

a plurality of patch antennas above the rectangular ground plane, the plurality of patch antennas being configured into a linear array that extends across a length substantially equal to the width of the rectangular ground plane, each patch antenna in the plurality of patch antennas including a first portion closer to the first edge and a second portion closer to the second edge;

a plurality of first feeds arranged in a sequence corresponding to the plurality of patch antennas, the plurality of first feeds being configured to alternate in orientation such that each subsequent first feed in the sequence is configured to couple to the second portion of a respective patch antenna responsive to a preceding first feed in the sequence being configured to couple to the first portion of a respective patch antenna and such that each subsequent first feed in the sequence is configured to couple to the first portion of its respective patch antenna responsive to the preceding first feed in the sequence being configured to couple to the second portion of its respective patch antenna; and a plurality of via walls coupled to the rectangular ground plane and arranged corresponding to the plurality of patch antennas, the plurality of via walls being configured to alternate in orientation such that each via wall is configured to extend only along a portion of the first edge adjacent a respective patch antenna responsive to the respective patch antenna's first feed being coupled to the respective patch antenna's first portion and such that each via wall is configured to extend only along a portion of the second edge adjacent the respective patch antenna responsive to the respective patch antenna's first feed being coupled to the respective patch antenna's second portion.

14. The antenna assembly of claim 13, wherein the rectangular ground plane is defined by the width and a height, wherein the width of the rectangular ground plane is greater than a height of the rectangular ground plane.

15. The antenna assembly of claim 13, wherein each first feed in the plurality of first feeds is configured to cause the respective patch antenna to transmit and receive according to a first linear polarization.

16. The antenna assembly of claim 15, wherein the first linear polarization has an electric field that is orthogonal to the first edge and with the second edge.

17. The antenna assembly of claim 15, further comprising:

a plurality of second feeds corresponding to the plurality of patch antennas, each second feed in the plurality of second feeds being coupled to a respective patch antenna from the plurality of patch antennas and being configured to cause the respective patch antenna to transmit and receive according to a second linear polarization that is orthogonal to the first linear polarization.

18. The antenna assembly of claim 17, wherein the first linear polarization is a vertical linear polarization, and wherein the second linear polarization is a horizontal linear polarization.

19. The antenna assembly of claim 13, further comprising:

a radio frequency (RF) transmitter configured to drive each subsequent first feed with an RF signal that is 180 degrees out of phase with an RF signal driven to the preceding first feed.

20. The antenna assembly of claim 13, further comprising:

a substrate adjacent the rectangular ground plane.

21. The antenna assembly of claim 20, wherein the substrate is a semiconductor die substrate.

22. An antenna assembly, comprising:

a ground plane having a first edge and a second edge that both extend across a width of the ground plane;

a first rectangular patch antenna and a second rectangular patch antenna both being spaced apart from the ground plane by an antenna height;

a plurality of parasitic patches disposed adjacent each of the first rectangular patch antenna and the second rectangular patch antenna, each rectangular patch antenna and it's corresponding plurality of parasitic patches being symmetric, disregarding any feed interfaces, with respect to an axis for the rectangular patch antenna extending from a first corner of the rectangular patch antenna to an opposing second corner of the rectangular patch antenna, wherein the axis is orthogonal to the first edge and to the second edge;

a first feed coupled to a first portion of the first rectangular patch antenna that is spaced apart from a center of the first rectangular patch antenna towards the first rectangular patch antenna's first corner;

a second feed coupled to a first portion of the second rectangular patch antenna that is spaced apart from a center of the second rectangular patch antenna towards the second rectangular patch antenna's second corner;

a first plurality of vias coupled to the ground plane, each via of the first plurality of vias being configured to extend from the ground plane to substantially the antenna height, the first plurality of vias being configured to extend in a first line along the first edge of the ground plane, wherein the first line intersects two of the plurality of parasitic patches disposed adjacent the first rectangular patch antenna; and a second plurality of vias coupled to the ground plane, each via of the second plurality of vias being configured to extend from the ground plane to substantially the antenna height, the second plurality of vias being configured to extend in a second line along the second edge of the ground plane, wherein the second line intersects two of the plurality of parasitic patches disposed adjacent the second rectangular patch antenna.

23. The antenna assembly of claim 22, wherein vias are absent from a portion of the second edge that is adjacent the first rectangular patch antenna and vias are absent from a portion of the first edge that is adjacent the second rectangular patch antenna, and wherein vias are absent from an area between the first rectangular patch antenna and the second rectangular patch antenna.

24. The antenna assembly of claim 22, wherein vias in the first plurality of vias are disposed adjacent the second rectangular patch antenna and vias in the second plurality of vias are disposed adjacent the first rectangular patch antenna, and wherein vias are absent from an area between the first rectangular patch antenna and the second rectangular patch antenna.

25. The antenna assembly of claim 22, wherein the first rectangular patch antenna and the second rectangular patch antenna each comprise a square patch antenna.

26. The antenna assembly of claim 22, further comprising:

a third feed coupled to a second portion of the first rectangular patch antenna that is spaced apart from the center of the first rectangular patch antenna towards a third corner of the first rectangular patch antenna; and a fourth feed coupled to a second portion of second rectangular patch antenna that is spaced apart from the center of the second rectangular patch antenna towards a third corner of the second rectangular patch antenna.

27. The antenna assembly of claim 26, wherein the first feed and the second feed are both configured to excite a first linear polarization, and wherein the third feed and the fourth feed are both configured to excite a second linear polarization that is orthogonal to the first linear polarization.

28. The antenna assembly of claim 27, wherein the first linear polarization is a vertical linear polarization, and wherein the second linear polarization is a horizontal linear polarization.

29. The antenna assembly of claim 22, further comprising:

a third rectangular patch antenna arranged between the first rectangular patch antenna and the ground plane; and a fourth rectangular patch antenna arranged between the second rectangular patch antenna and the ground plane.

30. The antenna assembly of claim 29, wherein the third rectangular patch antenna and the fourth rectangular patch antenna are both configured for a first frequency and wherein the first rectangular patch antenna and the second rectangular patch antenna are both configured for a second frequency that is higher than the first frequency.

31. The antenna assembly of claim 22, wherein each of the plurality of parasitic patches has one corner which is truncated to fit within the dimensions of the ground plane.

32. The antenna assembly of claim 1, wherein the first patch antennas is rectangular and has an axis extending from a first corner of the patch antenna to an opposing second corner of the patch antenna, wherein the axis is orthogonal to the first edge and to the second edge.

* * * * *